May 19, 1970     H. L. DOBRIKIN ET AL     3,512,552
PISTON RELAY VALVE
Filed Sept. 18, 1967
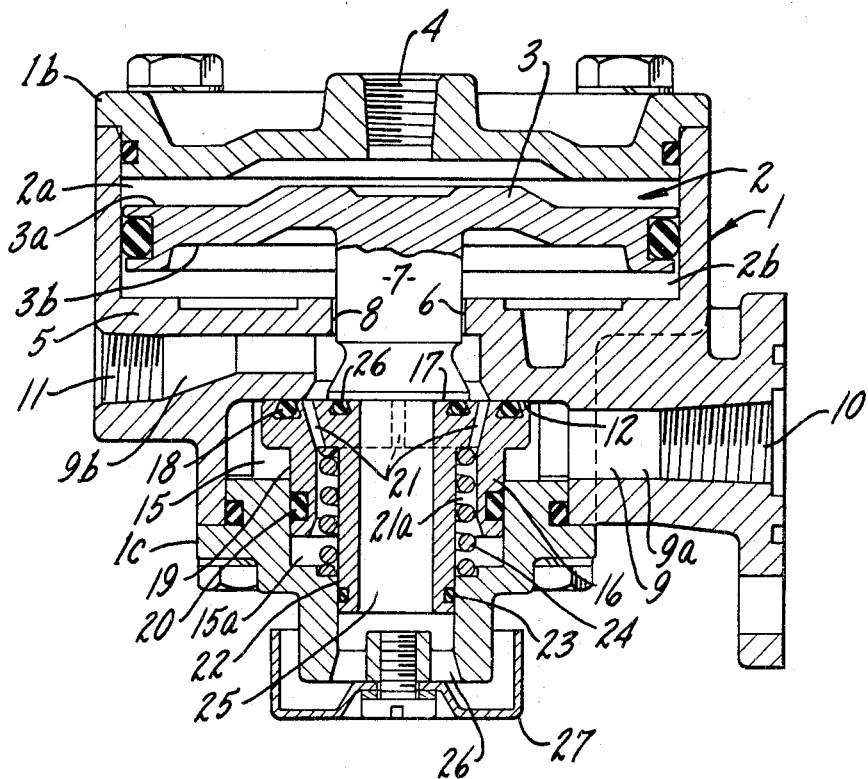
INVENTORS.
HAROLD L. DOBRIKIN
BOLESLAW KLIMEK
BY Parker & Carter
Attorneys.

United States Patent Office 3,512,552
Patented May 19, 1970

1

3,512,552
PISTON RELAY VALVE
Harold L. Dobrikin, Highland Park, and Boleslaw Klimek, Des Plaines, Ill., assignors to Berg Mfg. & Sales Co., Des Plaines, Ill., a corporation of Illinois
Filed Sept. 18, 1967, Ser. No. 668,376
Int. Cl. F16k 45/02
U.S. Cl. 137—627.5                    1 Claim

ABSTRACT OF THE DISCLOSURE

A relay valve for vehcle air brake systems in which a service piston extension projects through a restricted bore to open a valve shuttle and the shuttle has equiarea seals exposed to pressure to balance the shuttle.

SUMMARY OF THE INVENTION

A relay valve having a service piston having one side exposed to service pressure and an extension projecting through a restricted bore to limit delivery of reservoir pressure to the opposite side of the service piston, the extension contacting a valve shuttle to close an exhaust passage therethrough and to open the shuttle against a spring to communicate the reservoir pressure with brake cylinders, equidiameter seals on opposite ends of the shuttle exposed to pressure to balance it, the exhaust passage seal and an atmospheric seal on the shuttle being also of equal diameters.

This invention relates to vehicle air brake systems and has particular relation to a relay valve useful in said systems.

One purpose of the invention is to provide a balanced relay valve.

Another purpose is to provide a relay valve including a service piston disposed on one side to service pressure and having means restricting the flow of air brake pressure to its opposite side.

Another purpose is to provide a relay valve having a balanced valve shuttle.

Another purpose is to provide a relay valve including a valve shuttle and means for delivering substantially equal fluid pressures to the opposite sides of said shuttle.

Other purposes will appear from time to time during the course of the specification and claim.

The invention is illustrated more or less diagrammatically in the accompanying drawing wherein:

The figure is a cross-sectional view.

Like parts are indicated by like numerals throughout the specification and drawing.

Referring now to the drawing, the numeral 1 generally designates a valve housing. Closures 1b and 1c for the opposite ends of the housing 1 permit ease of access to the elements therein.

A service chamber 2 in housing 1 is divided by a freely reciprocal service piston 3 into subchambers 2a and 2b. A service pressure inlet 4 delivers service fluid pressure to the chamber 2a and the forward surface 3a of piston 3.

The housing 1 has a crosswall 5 defining with the opposed surface 3b of piston 3 the chamber 2b. A central passage 6 is formed in wall 5. An axially aligned extension 7 is formed on piston 3 and extends from the surface 3b through passage 6. The diameters of passage 6 and extension 7 are so close as to form a restricted annular passage 8 for the flow of fluid pressure.

A transfer passage 9 extends through the housing 1 from a reservoir pressure inlet 10 to the brake chamber outlet 11. A valve seat 12 is formed in housing 1 intermediate the inlet 10 and outlet 11 and dividing transfer passage 9 into an inlet portion 9a and an outlet portion 9b. It will be observed that annular passage 8 provides for restricted flow of fluid pressure from transfer passage 9b to chamber 2b.

A shuttle chamber 15 communicates with transfer passage 9 and a valve shuttle 16 is reciproal in chamber 15 to control communication between inlet 10 and outlet 11. Shuttle 16 has an end face 17 carrying a transfer valve seal 18 for engagement with seat 12 to close communication between inlet 10 and outlet 11. Shuttle 16 has a first, outer circumferential surface 19 carrying the seal 20 in engagement with a circumferential wall surface of chamber 15. It will be observed that the diameters of seals 18 and 20 are identical.

The wall or circumferential portion 19 of shuttle 16 is of an extension less than the length of chamber 15 to form a subchamber 15a beyond the seal 20. Passages 21 project through the surface 17 and through shuttle 16 to communicate the area beyond the end face 17 with the subchamber 15a.

Shuttle 16 includes an inner circumferential surface 22 carrying a seal 23 in engagement with a reduced circumferential inner wall surface of chamber 15 beyond subchamber 15a. A spring 24 is positioned within the axially aligned space 21a between circumferential portions 19, 22 of shuttle 16, which space also constitutes a continuation of passage 21. The spring 24 urges shuttle 16 into the closed position illustrated in the drawing. Extending axially through shuttle 16 is an exhaust passage 25. End face 17 of shuttle 16 carries an exhaust seal 26 in position for engagement by extension 7 to close exhaust passage 25. The passage 25 communicates with atmosphere through a housing exhaust outlet 26 which in turn supports a dust shield 27. It will be observed that the diameters of seals 23 and 26 are identical. It will further be observed that the inlet portion 9a of transfer passage 9 communicates with chamber 15 on the opposite side of seal 20 from subchamber 15a.

While the passages 21 are shown as four in number, two being shown in full lines and one being shown in dotted line in the drawing, the fourth being understood as diametrically positioned with respect to that shown in dotted lines, it will be understood that the passages 21 may vary in number without departing from the nature and scope of the invention. Passages 21 penetrate the surface 17 between the seals 18 and 26, whereby the outlet portion 9b of transfer passage 9 is in perpetual communication with passages 21 and subchamber 15a and the passages 21 are in communication with the entire passage 9 when seal 18 is off its seat 12.

The use and operation of the invention are as follows:

With the parts in the position shown in the drawing the valve is at rest and ready for brake application. Upon actuation of an application valve (not shown), normally actuated through the vehicle operator's foot pedal (not shown), service fluid pressure is delivered at inlet 4. In response thereto the free service piston 3 moves away from inlet 4 or downwardly as the parts are shown in the drawing. Downward movement of piston 3 through the mediacy of extension 7 produces a corresponding downward movement, as the parts are shown, of the valve shuttle 16 to unseat valve seal 18 from its seat 12 and to open passage 9 for delivery of fluid pressure from a pressure reservoir (not shown) communicating with inlet 10 to the vehicle brake actuating cylinders (not shown) in communication with outlet 11.

Through the mediacy of passages 21, 21a the fluid pressure thus present in transfer passage 9 is delivered to subchamber 15a to balance shuttle 16, leaving the force of spring 24 as the primary influencing factor on shuttle 16.

The pressure in transfer chamber 9 is also delivered, more slowly, through restricted annular passage 8 to the subchamber 2b and to the opposite surface 3b of service piston 3 to react against the service pressure delivered at inlet 4.

Upon release of the brake pedal by the vehicle operator and the resultant diminution of pressure at inlet 4, the service piston balancing pressure in chamber 2b moves service piston upwardly as the parts are shown in the drawing to separate the extension 7 from the exhaust seal 26 and to open communication between the brake cylinders through passage portion 9b and the exhaust passage 25 to exhaust the brake cylinders, chamber 2b and passage portion 9b to atmosphere. With extension 7 separated from exhaust seal 26, subchamber 15a is also exhausted to atmosphere through passages 21 and exhaust passage 25. The restricted passage 8 provides for delayed exhaust of subchamber 2b so as to hold exhaust passage 25 open while the brake cylinders and subchamber 15a are exhausted to atmosphere, the shuttle, under the influence of spring 24, having been moved to the position shown in the drawing upon release of service pressure at inlet 4 to close communication between inlet 10 and exhaust passage 25.

There is claimed:
1. A relay valve including a housing, a service piston reciprocal in said housing, a service pressure inlet positioned in said housing to deliver pressure to one side of said piston, an extension on the opposite side of said piston, a transfer passage through said housing, a bore communicating said transfer passage with said opposite side of said piston, said extension projecting through said bore and creating therewith a restricted annular passage, a valve shuttle, a spring yieldingly urging said shuttle into position closing said transfer passage, an exhaust passage through said shuttle and communicating said transfer passage with atmosphere, said extension being movable into a position to close said exhaust passage and to move said shuttle against said spring to open said transfer passage, said service piston being urged toward said service inlet solely by said spring and pressure communicated through said restricted annular passage.

References Cited

UNITED STATES PATENTS

| | | | |
|---|---|---|---|
| 2,985,490 | 5/1961 | Gates | 303—40 |
| 3,125,379 | 3/1964 | Valentine | 303—40 X |
| 3,181,917 | 5/1965 | Dobrikin | 137—627.5 X |
| 3,219,395 | 11/1965 | Schwartz | 303—40 X |
| 3,252,471 | 5/1966 | Olson | 137—627.5 X |

CLARENCE R. GORDON, Primary Examiner

U.S. Cl. X.R.

303—40